F. W. BAUMGAERTNER.
CYCLOMETER.
APPLICATION FILED MAR. 4, 1912.

1,058,938.

Patented Apr. 15, 1913.
2 SHEETS—SHEET 1.

WITNESSES:
Mary H. Bifel.
E. H. Hatter.

INVENTOR.
Friedrich W. Baumgaertner,
BY
Geo. E. Waldo,
ATTORNEY.

F. W. BAUMGAERTNER.
CYCLOMETER.
APPLICATION FILED MAR. 4, 1912.
1,058,938.
Patented Apr. 15, 1913.
2 SHEETS—SHEET 2.
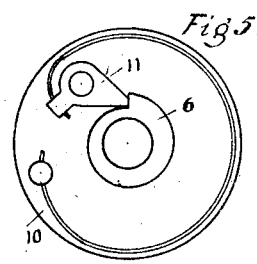
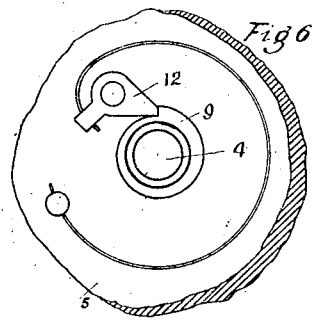
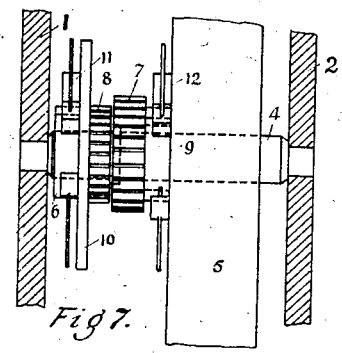
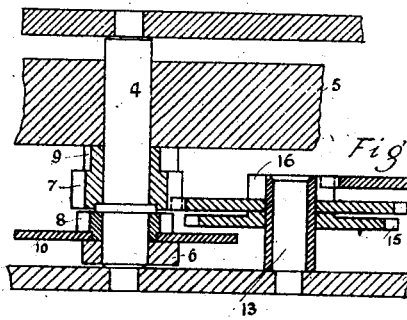
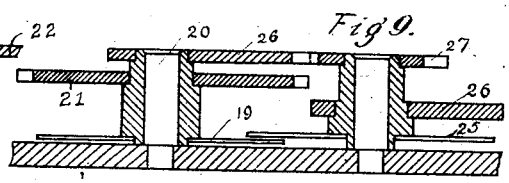
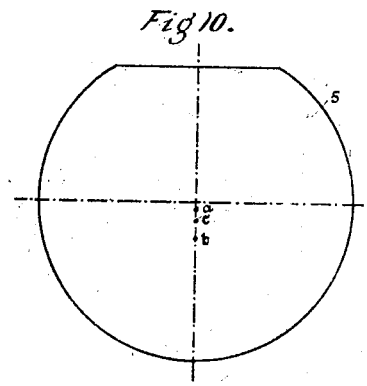
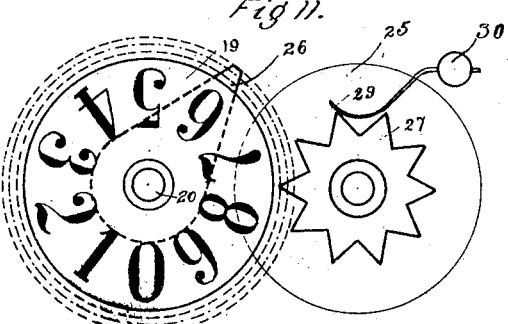
WITNESSES:
Mary H. Bifel
E. G. Ritter
INVENTOR.
Friedrich W. Baumgaertner
BY Geo. E. Waldo
ATTORNEY.

UNITED STATES PATENT OFFICE.

FRIEDRICH W. BAUMGAERTNER, OF CLEVELAND, OHIO.

CYCLOMETER.

1,058,938.	Specification of Letters Patent.	Patented Apr. 15, 1913.

Application filed March 4, 1912. Serial No. 681,391.

*To all whom it may concern:*

Be it known that I, FRIEDRICH WILHELM BAUMGAERTNER, a subject of the Emperor of Germany, and a resident of Cleveland, in the county of Cuyahoga and State of Ohio, have invented a certain new and useful Improvement in Cyclometers, of which the following is a specification.

This invention relates to cyclometers, and relates particularly to that class or type of cyclometers constructed and arranged to be mounted bodily on a rotating part or member, as for example, the hub of an automobile wheel. As regards one of its features, also, the invention has particular reference to what are commonly known as self-contained cyclometers, that is, in which the registering mechanism is actuated through the medium of a weight on an arbor forming part of the device, which is mounted concentric with the axis of rotation of the device.

One object of the invention is to provide a cyclometer of this type of improved and simplified construction, whereby the registering mechanism will register progressively in one direction, regardless of the direction of rotation of the part or member on which it is mounted.

So far as I am aware, all self-contained cyclometers of the type to which my invention relates have been inaccurate and of very little practical value in applications where they are subject to shocks and jolts, as on automobiles and the like, when passing over rough roads, or when stopped suddenly, for the reason that, as heretofore constructed, the momentum of the weight will produce a movement which will cause said weight to turn or throw over or make one or more revolutions, which will, of course, impair the accuracy of the device more or less, depending upon the frequency with which it happens.

The object of my invention, as it relates to self-contained cyclometers of this type, is to overcome this objectionable feature by providing a cyclometer which will register accurately, regardless of outside shocks and jolts to which it is subjected in use.

To effect the foregoing objects, a cyclometer embodying my invention comprises the various features, combinations of features and details of construction hereinafter described and claimed.

Figures 1, 2:
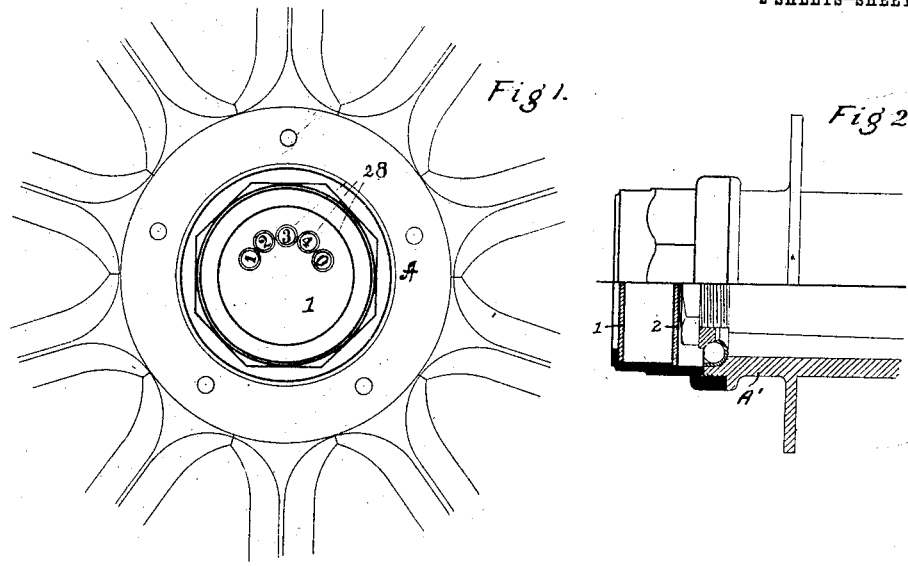
Figures 3, 4:
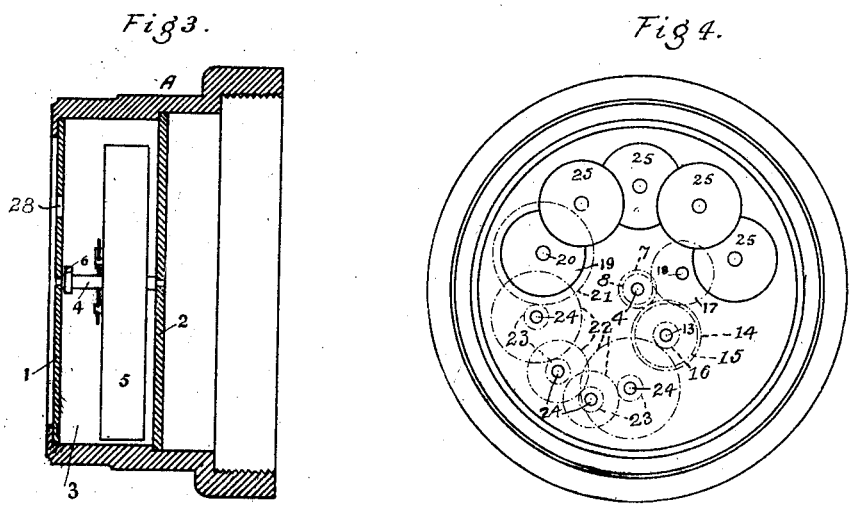

In the accompanying drawings, in which my invention is fully illustrated,—Figure 1 is a front view of a cyclometer of my invention attached to the hub of a wheel; Fig. 2 is a side view of a cyclometer of my invention attached to the hub of a wheel, showing the lower half of the cyclometer casing in section; Fig. 3 is a vertical, central, sectional view of a cyclometer casing of my invention, showing the suspension arbor and the weight thereof; Fig. 4 is a diagrammatic rear view of the casing and of the gearing for actuating the indicator dials; Figs. 5 and 6 are enlarged fragmentary views, illustrating the means for connecting the different trains of gearing to the suspension arbor of the cyclometer; Fig. 7 is a fragmentary side view of the suspension arbor and parts carried thereon; Figs. 8 and 9 are fragmentary sectional views on an enlarged scale, showing the manner of actuating the indicator dials from the suspension arbor; Fig. 10 is a diagrammatic view illustrating the location of the center of gravity of the weight relative to its point of suspension; and Fig. 11 is a fragmentary view illustrating the manner of actuating subsequent indicator dials from preceding indicator dials.

In the accompanying drawings, I have, for purposes of concrete illustration, shown the improvements forming my invention as embodied in a "hub cyclometer" designed and adapted for use on automobiles and the like. I desire it to be understood, however, that I do not limit myself to the specific application shown.

Referring now to the drawings, A designates the casing of my improved cyclometer, which is made in the usual form of a hub cap threaded to the end of one of the wheel hubs A' of an automobile or the like, so as to rotate therewith.

The operative parts of the device are mounted directly in plates 1 and 2 secured in spaced positions within the cap A, and which, with said cap, define a dust and dirt proof chamber 3 in which said operative parts are inclosed.

Rotatably mounted in suitable bearings in the plates 1 and 2, concentric with the axis of rotation of the hub A', is an arbor 4 secured to rotate with which are a weight 5 and a ratchet 6, and mounted to rotate freely on said arbor are pinions 7 and 8. Rigidly secured to said pinions 7 and 8 respectively, are a ratchet 9 and a disk 10. As shown, said ratchets have only one tooth, but the teeth may be increased, as desired. Coöperating with the ratchet 6 is a pawl 11 pivoted to the side of the disk 10, and coöperating with the ratchet 9 is a pawl 12 pivoted to the side of the weight 5.

Rotatably mounted on a stud 13 secured in the outer plate 1, are gear wheels 14 and 15 and a pinion 16, all of which are rigidly connected so as to rotate together, and of which the gear 14 meshes directly with the pinion 7 on the arbor 4, and the gear 15 is in train with the pinion 8 through an intermediate idle gear 17 mounted on a stud 18 (Fig. 4) secured in the front plate 1 of the casing A. The pinion 16 is in train with the first or units indicator dial 19. As shown, said indicator dial 19 is mounted on a stud 20 secured in the front casing plate 1 and the gearing connecting the pinion 16 with said indicator dial 19 comprises a gear 21 secured to rotate with said indicator dial and intermediate gears and pinions 22 and 23 secured together in pairs, each comprising a rigidly connected gear and pinion mounted to rotate freely on studs 24 secured in the front casing plate 1. The indicator dial 19 is provided on its outer face with the usual numerals indicative either of revolutions made or distance traveled, the number and sizes of the intermediate gears and pinions being such that said dials will express any desired units, in a usual manner. In like manner, the cyclometer may comprise any desired number of additional dials 25, actuated from the units dial 19 and adapted to indicate and record multiples, as tens, hundreds, thousands, etc., of the units dial 19. As shown, said succeeding dials 25 are actuated by means of fingers 26 (Figs. 9 and 11) secured to rotate with each preceding dial, and which are adapted to engage the teeth of star wheels 27 secured to rotate with preceding dials, all in a familiar manner. The numerals on the dials are positioned to register with sight openings 28, registration of said numerals with said sight openings being effected and maintained by means of spring pawls 29, which are supported by pins 30 secured in the front plate 1 of the casing A.

Much of the foregoing mechanism is old and well known, and will be readily understood by those familiar with the art from the foregoing general description of the dials and operating gearing therefor, without describing the same more in detail.

Assuming, for example, that the cyclometer is attached to one of the lefthand wheels of a vehicle, the direction of rotation of different parts, as the vehicle advances, will be called "lefthanded" and when the vehicle backs, "righthanded." With this understanding, as the vehicle advances, the stud 13 on which the gears 14 and 15 and the pinion 16 are mounted will describe a lefthanded circle around the axis of the arbor 4, which, in view of the greater resistance offered to the rotation of the gear 14, which meshes with the pinion 7 through the dial operating gearing, will tend to hold said gear 14 against rotation on the stud 13 and to impart lefthand rotation to said pinion, and such rotation will be imparted to said pinion until a tooth of the ratchet 9, secured to said pinion, engages the pawl 12 on the weight 5, whereupon said pinion will be held against rotation and lefthand rotation imparted to the gear 14 on its stud. In like manner, lefthand rotation will be imparted to the gear 15, which, through the intermediate idle gear 17, will impart lefthanded rotation to the pinion 8 and disk 10 secured thereto, which rotation may continue indefinitely, as it will merely cause the pawl 11 to run over the teeth of the ratchet 6. Also, the dial gearing is such that lefthand rotation of the gears 14 and 15 and thus of the pinion 16 will cause said dials to register progressively, in usual manner. On the other hand, when the vehicle backs, the stud 13 describes a righthanded circle around the axis of the arbor 4, which, owing to the greater resistance offered to the rotation of the gear 14, will tend to impart righthand rotation to the pinion 7 and ratchet 9, and as rotation in this direction will merely cause said pawl to run over the teeth of said ratchet, such righthanded rotation will occur. Through the intermediate gear 17, righthanded rotation of the gear 15 will also tend to impart righthanded rotation to the pinion 8 and to the disk 10 secured thereto, but said pinion and disk being held against righthanded rotation by engagement of the pawl 11 with the teeth of the ratchet 6, righthanded rotation of said cyclometer will impart righthanded rotation to the intermediate idle gear 17, which meshes directly with the pinion 8 and which will, in turn, impart lefthanded rotation to the gear 15 and to the pinion 16, such lefthanded rotation corresponding to progressive registration of the dials, as previously assumed. It is thus apparent that said cyclometer will record progressively, regardless of the direction of rotation of the cyclometer or whether the vehicle to which it is attached is advancing or backing.

The operation of the registering mechanism of the cyclometer is, of course, dependent upon the weight 5, which, in order to be effective, must be sufficiently heavy and supported in such manner that its center of gravity will be a sufficient distance below the axis of suspension of said weight that it will overcome the turning moment produced thereon by the resistance, friction, etc., of the registering mechanism. Heretofore, in order to insure operation of the registering mechanism, the universal practice, so far as I am aware, has been to select the location of the center of gravity of the weight with reference to this feature only, thus entirely ignoring the effect on the weight of other forces, as outside shocks, jars and the like, principally due to rough and uneven roads. To be safe, the practice has been to locate the center of gravity of the weight so far below its axis of suspension that the shocks and jolts to which the vehicle is ordinarily subjected in running, will exert a moment on said weight sufficient to cause it to throw entirely over one or more times, each such rotation of the weight operating on the recording mechanism the same as the rotation of the part to which the cyclometer is applied, thus causing the cyclometer to register inaccurately. In seeking to remedy this defective construction and operation, I started with the obvious proposition that, if the center of gravity of the weight were coincident with its axis of suspension, all lines of force due to outside shocks and jars would pass directly through the axis of suspension and would therefore be absorbed directly by the suspension means and would exert no turning movement on the weight. This is an impossible condition, however, for the reason that the weight suspended in this manner would produce no force to oppose the resistance of the registering mechanism, which would accordingly remain stationary while the weight would rotate. Thus, in order that the weight shall overcome the resistance of the registering mechanism, it is obvious that the center of gravity of the weight must be located below its axis of suspension, and in order that the effect of outside shocks and jars on the weight may be as slight as possible, it is necessary that the center of gravity of said weight shall be located as close to its axis of suspension as practicable, whereby the turning moment produced on the weight by outside shocks and jars shall not be great enough to cause said weight to rotate. As the resistance of the registering mechanism is practically constant, it is apparent that, as the weight is heavier, its center of gravity may be located closer to its axis of suspension, and in the practice of my invention, I employ a weight which is sufficiently heavy that it will counterbalance the resistance of the registering mechanism with its center of gravity located only a short distance, say one-sixteenth to three-thirty-seconds of an inch, below the axis of suspension of said weight. Said weight is made of such heaviness, also, that the center of gravity thereof may be located a considerably greater distance, say one-fourth to five-sixteenths of an inch, below its axis of suspension, without producing a turning moment sufficient to cause said weight to throw or turn entirely over under an assumed maximum outside shock, which, as previously stated, would cause said cyclometer to register inaccurately. Thus, by so proportioning the weight that its center of gravity will be between these limits, a factor of safety will be provided which will insure the designed operation of the cyclometer under all conditions of use. For example, in Fig. 10, let $a$ represent the location of the center of gravity of a weight sufficiently heavy to overcome or counterbalance the resistance of the registering mechanism, and $b$ the location of the center of gravity of a weight of the same heaviness, but differently proportioned, so that the turning movement of said weight under an assumed maximum outside shock will be insufficient to cause said weight to turn entirely over. Now, by proportioning said weight so that its center of gravity will be at a point $c$ between the points $a$ and $b$, we increase the resistance of the weight to the rotative tendency which the registering mechanism exerts on said weight, and also reduce the turning moment produced on the weight by outside shocks and jars, thereby insuring the designed operation of the cyclometer under all conditions of use.

I claim:—

1. In a cyclometer, the combination of a casing secured to a rotatable part or member, registering mechanism and means for actuating the same mounted in said casing, said actuating means comprising an arbor rotatably mounted in said casing concentric with the axis of rotation of said part or member to which said casing is connected, means for securing said arbor against rotation, a ratchet secured to said arbor, pinions rotatably mounted on said arbor, a ratchet secured to one of said pinions, a pawl pivoted to a non-rotatable part adapted to engage said ratchet, a pawl pivoted to the other of said pinions adapted to engage the ratchet on said arbor, a stud secured in said casing, gears and a pinion mounted to rotate freely on said stud, said gears and pinion being all connected so as to rotate together, one of said gears meshing directly with one of the pinions on said arbor, an idle gear which meshes with the other gears on said stud and arbor, respectively, and gearing connecting the pinion on said stud with the registering mechanism, substantially as described.

2. In a cyclometer, the combination of a casing secured to a rotatable part or member, registering mechanism, and means for actuating the same mounted in said casing, said actuating means comprising an arbor rotatably mounted in said casing concentric with the axis of rotation of said part or member to which said casing is connected, a weight and a ratchet secured to said arbor, pinions rotatably mounted on said arbor, a ratchet secured to one of said pinions, a pawl pivoted to the weight adapted to engage said ratchet, a pawl pivoted to the other of said pinions adapted to engage the teeth of the ratchet secured to said arbor, a stud secured in said casing, gears, and a pinion mounted to rotate freely on said pinion, said gears and pinion being all connected so as to rotate together, one of said gears meshing directly with one of the pinions on said arbor, an idle gear which meshes with the other gears on said stud and arbor, respectively, and gearing connecting the pinion on said stud with the registering mechanism, substantially as described.

3. In a cyclometer of the type described, the combination of registering mechanism and means for actuating the same, said means comprising a pivoted weight which extends above or surrounds its pivotal axis and is proportioned to bring its center of gravity closely adjacent to its pivotal axis, the relation being such that the moment exerted upon said weight by outside shock will be insufficient to cause said weight to "throw over," substantially as described.

In testimony, that I claim the foregoing as my invention, I affix my signature in presence of two subscribing witnesses this 27th day of February A. D., 1912.

FRIEDRICH W. BAUMGAERTNER.

Witnesses:
MARY H. BIXEL,
E. M. KLATCHER.